United States Patent [19]

Ichinokawa

[11] Patent Number: 4,486,092
[45] Date of Patent: Dec. 4, 1984

[54] MECHANISM FOR PREVENTING COLLISION OF HALF-SPEED MIRROR FROM OCCURRING IN VARIABLE SCALE FACTOR COPYING APPARATUS

[75] Inventor: Kazuhiro Ichinokawa, Tokyo, Japan

[73] Assignee: Asahi Kogaku Kogyo Kabushiki Kaisha, Tokyo, Japan

[21] Appl. No.: 496,735

[22] Filed: May 20, 1983

[30] Foreign Application Priority Data

Jun. 22, 1982 [JP] Japan .............................. 57-93170[U]

[51] Int. Cl.³ .................. G03B 27/34; G03B 27/40; G03B 27/70; G03B 15/30
[52] U.S. Cl. .......................................... 355/8; 355/49; 355/57; 355/11; 250/560; 358/285
[58] Field of Search .................. 355/11, 49, 66, 3 R, 355/8, 14 R, 57; 250/200, 559, 560, 561; 358/199, 209, 285, 286, 287

[56] References Cited

U.S. PATENT DOCUMENTS 4,373,803  2/1983  Shogren ............................ 355/8 X
4,436,416  3/1984  Negoro et al. ..................... 355/8 X

*Primary Examiner*—John Gonzales
*Assistant Examiner*—Terry Flower
*Attorney, Agent, or Firm*—Sughrue, Mion, Zinn, Macpeak & Seas

[57] ABSTRACT

A collision preventing mechanism for preventing a collision between a zoom lens system and a half-speed mirror in a variable scale factor copying apparatus for forming an electrostatic, latent image through the lens system onto a photo-sensitive drum by scanning an original document by a full-speed mirror and the half-speed mirror includes a device for moving the zoom lens system away from the half-speed mirror when an abnormal approach of the half-speed mirror causes the half-speed mirror to be moved into the vicinity of a zone which is occupied by the zoom lens system. This mechanism also includes a detector for detecting the abnormal approach of the half-speed mirror.

6 Claims, 4 Drawing Figures

MECHANISM FOR PREVENTING COLLISION OF HALF-SPEED MIRROR FROM OCCURRING IN VARIABLE SCALE FACTOR COPYING APPARATUS

BACKGROUND OF THE INVENTION

The present invention relates to a mechanism for preventing a collision between a half-speed mirror and a zoom lens system in a variable scale factor copying apparatus.

FIG. 1 illustrates a variable scale factor copying apparatus which has been proposed by the applicant of the present application. In the variable scale factor copying apparatus of FIG. 1, a light source 4 reciprocates between a stand-by position A and a termination position B to radiate light for scanning an original document 3 which is mounted on a contact glass plate 2 that is disposed in front of a copying apparatus body 1. The image-carrying light reflected from the original document 3 is received by a full-speed mirror 5 which is moved along with the light source 4. The image-carrying light is reflected by half-speed mirrors 6 and 7 to a zoom lens system 8, and the zoom lens system is moved along its optical axis in accordance with a designated copying scale factor. The zoom lens system 8 emits the received, image-carrying light with the designated copying scale factor. The image-carrying light which is emitted from the zoom lens system 8 is radiated onto a photo-sensitive drum 10 through a fixed mirror 9 so that it forms an electrostatic, latent image of the original document, which is multiplied by the designated scale factor on the surface of the drum 10. Then, the copying operation is completed through ordinary steps.

In the steps mentioned above, it is necessary to move the half-speed mirrors 6 and 7 so that they can reduce the amount that is scanned by the full-speed mirror 5 by half to maintain the distance between respective images on the original document 3 and the sensitive drum 10 constant. In addition, an operator is required to move the zoom lens system 8 in accordance with the designated copying scale factor. Various scanning ranges of the half-speed mirror for several designated copying scale factor positions of the zoom lens system 8 are illustrated in FIG. 2. In order to reduce the size of the copying apparatus body, it is preferable to have the scanning zone of the half-speed mirrors 6 and 7 overlap the travelling zone of the zoom lens system 8. That is, the position of the zoom lens system 8 when the image of the original document is enlarged may enter the scanning end region of the half-speed mirrors 6 and 7 when the original document image is copied with an even or reduced scale factor.

Thus, since the zoom lens system 8 enters the scanning zone of the half-speed mirrors when the document image is enlarged, it is necessary to control the movement of the half-speed mirrors 6 and 7 so that these mirrors do not collide with the zoom lens system 8. However, the half-speed mirrors 6 and 7 are arranged so that they may scan the entire scanning range, and, therefore, there is a risk of a collision between the half-speed mirrors 6 and 7 and the zoom lens system 8 if the control system malfunctions and allows the half-speed mirrors 6 and 7 to move beyond the required amount.

SUMMARY OF THE INVENTION

An object of the present invention is to provide a mechanism in which a runaway of the half-speed mirrors due to a malfunction is detected, and to provide a mechanism which automatically moves the zoom lens system away from the runaway half-speed mirrors in order to prevent the zoom lens system from being damaged.

These and other objects are obtained by providing a collision preventing mechanism for preventing a collision between a lens system and a half-speed mirror in a variable scale factor copying machine for forming an electrostatic, latent image through said lens system onto a photo-sensitive drum by scanning an original document by using a full-speed mirror and the half-speed mirror. The collision preventing mechanism comprises means for moving the half-speed mirror and means for moving the lens system away from the half-speed mirror when an abnormal approach of said half-speed mirror causes said half-speed mirror to move into a vicinity of a zone which is occupied by the lens system to prevent a collision of the half-speed mirror and the lens system. The collision preventing mechanism also includes a detecting means for detecting the abnormal approach of the half-speed mirror. The means for moving the lens system includes a shaft; a swing member which is rotatably supported on the shaft; a rod-like feed screw; a motor; transmission means for engaging the motor with the feed screw to turn the feed screw a predetermined amount which is determined by a desired scale factor; a semiring-like nut; a release lever for releasing the semiring-like nut from the rod-like feed screw; and a rod-like member which is located at a forward end of the swing member for selectively engaging a push-button portion of a detector which detects the runaway of the half-speed mirrors.

DESCRIPTION OF THE PREFERRED EMBODIMENTS

Figure 1:
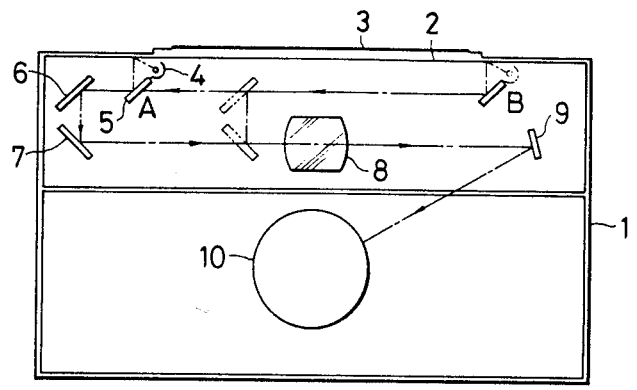
FIG. 1 is a diagram illustrating a variable scale factor copying apparatus.
Figure 2:
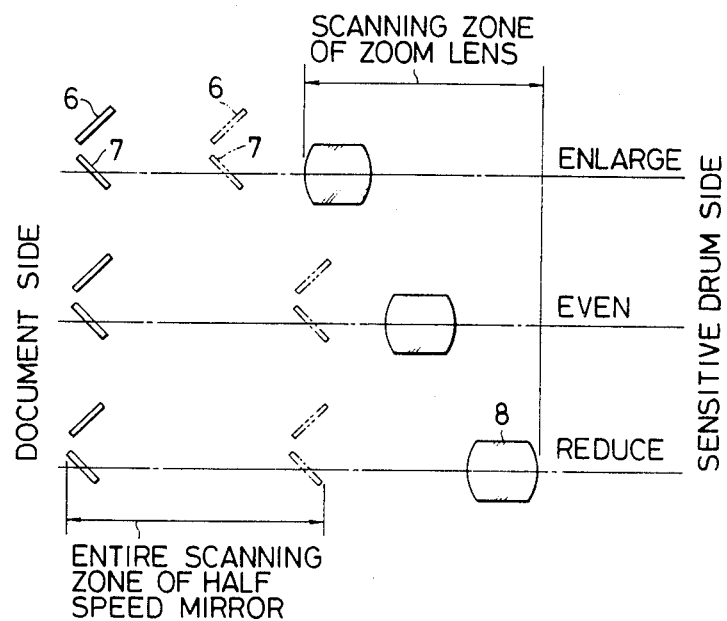
FIG. 2 is a diagram illustrating the relation between the scanning zone of the half-speed mirrors and the travelling zone of the zoom lens system.
Figure 3:
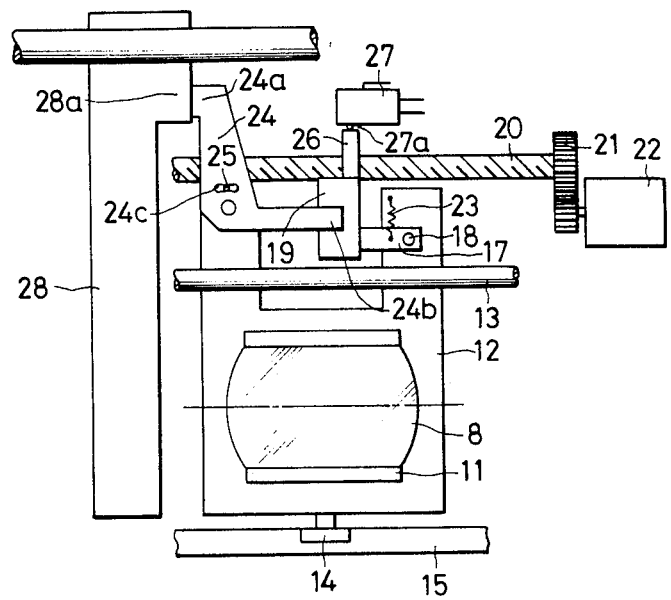
FIG. 3 is a diagram illustrating the collision preventing mechanism according to the present invention.
Figure 4:
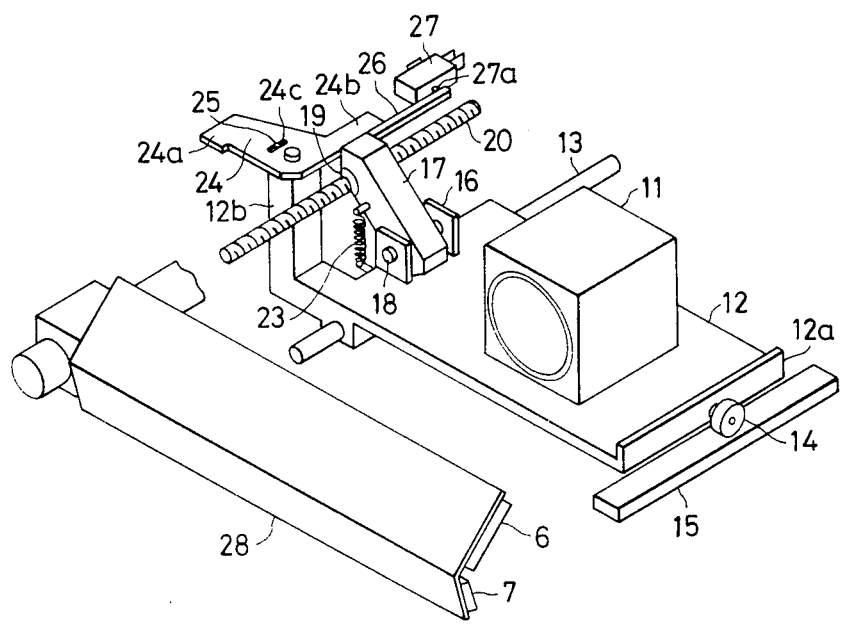
FIG. 4 is a perspective view of the collision preventing mechanism of FIG. 3.

FIG. 3 is a diagram illustrating the collision preventing mechanism according to the present invention, and FIG. 4 is a perspective view of the same. In FIGS. 3 and 4, a member 11 for supporting the zoom lens system 8 is fixed to a supporting frame 12. A first end of the supporting frame 12 is slidably mounted on a guide rod 13 which is bridged on the copying apparatus body so that it is parallel with an optical axis of the zoom lens system. Accordingly, the supporting frame and the zoom lens system may be moved in a direction which is parallel to the optical axis of the zoom lens system. A rotary member 14 is bearingly supported on a central portion of a side plate 12a which is formed at a second end of the supporting frame 12. The rotary member 14 rotates on a plane surface of a guide member 15 to help the supporting frame 13 move smoothly along the direction which is parallel with the optical axis of the zoom lens system 8.

A pair of bearings 16 are vertically mounted on the first end of the supporting frame 12 to support a shaft 18 of a swing member 17. As shown in FIG. 4, a semiring-like nut 19 which has a female thread is attached near the front end of the swing member 17. The semiring-like nut 19 engages a rod-like feed screw 20 which is also supported on the copying apparatus body 1 so that it extends parallel with the optical axis of the zoom lens system 8. An end of the feed screw 20 is coupled with a numerically controlled motor 22 through a transmission member 21. The motor 22 is supplied with pulses from a known control circuit (not shown), and the number of pulses corresponds to the copying scale factor which is designated by the operator. The motor rotates by an extent which corresponds to the number of the supplied pulses and causes the feed screw 20 to rotate via the transmission member 21 so that it causes the zoom lens system 8 to move along its optical axis, together with the supporting member 12, due to the engagement of the semiring-like nut 19 which is kept in place by the swing member 17 until the zoom lens system stops at a position corresponding to the designated copying scale factor. A spring 23 is provided between an end of the swing member 17 and a side end of the supporting frame 12 so that the semiring-like nut 19 engages the feed screw 20 with a proper pressing force which is provided by the biasing force of the spring.

A release lever 24 for releasing the semiring-like nut 19 upon the occurence of the runaway of the half-speed mirrors 6 and 7 will be described below. A detector 27 for detecting the runaway of the half-speed mirrors 6 and 7 will also be described.

The release lever 24 for releasing the semiring-like nut 19 upon the occurrence of the runaway of the half-speed mirrors 6 and 7 is substantially L-shaped, as shown in FIGS. 3 and 4. The release lever 24 is pivotally supported at its bent portion on the forward end of an L-shaped arm portion 12b which is formed at the first end portion of the supporting frame 12 so that a forward end portion 24a of the release lever 24 is placed in a position confronting the half-speed mirrors 6 and 7 so that it extends forward from the front surface of the zoom lens system 8. The rear end portion 24b of the release lever 24 is in contact with the front end of the swing member 17, and a hole 24c is formed in the vicinity of the bent portion of the release lever 24. A pin 25 is planted in the forward end of the arm portion 12b and extends through the hole 24c to restrict the amount of swing of the release lever 24. That is, the release lever 24 is allowed to rotate only through a range which is defined by the hole 24c since the ends of the hole 24c abut against the pin 25 after a predetermined amount of rotation.

A rod-like member 26 is located at a forward end of the swing member 17 and contacts a push-button portion 27a of a detector 27 for detecting the runaway of the half-speed mirrors 6 and 7. The detector 27 may be a known, touch-type micro-switch which is fixed onto the supporting frame 12 and which provides an on/off signal in response to the depression/release of the button portion 27a. When the push-button is relased from the rod-like member 26, a signal from the detector 27 is transferred to a known electrical control system (not shown) so that a power source for driving a supporting frame member 28 of the half-speed mirrors 6 and 7 is cut off in response to the signal to stop the scanning operation of the half-speed mirrors 6 and 7.

Assume now that the numerically controlled motor 22 is rotated so that the zoom lens system moves in a direction that enlarges the original document through the feed screw 20, the semiring-like nut 19, the swing member 17 and the supporting frame 12, and the zoom lens system stops in a predetermined position. From this state, the supporting frame member 28 of the half-speed mirrors 6 and 7 is moved until it is stopped in a predetermined position corresponding to the copying scale factor, and the copying operation is then performed. In case the supporting frame member 28 of the half-speed mirrors 6 and 7 unnecessarily moves toward the zoom lens system 8 beyond the predetermined position, a protrusion 28a of the supporting frame member 28 presses the forward end portion 24a of the release lever 24 to release the threading engagement between the semiring-like nut 19 and the feed screw 20. At the same time, the rod-like member 26 releases the push-button portion 27a from the detector button portion 27a. Thus, as described above, a signal from the detector 27 is transferred to a known electrical control system so that a power source for driving the supporting frame member 28 is cut off in response to the signal to stop the supporting frame member 28.

For a period during which the semiring-like nut 19 is released from the feed screw 20, the source for driving the supporting frame 28 is cut off, and the supporting frame member 28 is stopped. The supporting frame 12 receives an urging force from the supporting frame member 28 and moves backward, together with the supporting frame member 28. Accordingly, the major portion of the urging force due to the runaway of the supporting frame member 28 is not absorbed as an impact that is produced between the supporting frame member 28 and the supporting frame 12. Rather, the major portion of the force is utilized for moving the supporting frame 12 away from the supporting frame member 28 so that neither the supporting frame member 28 nor the supporting frame 12 is substantially affected by a collision between them.

As described above, according to the present invention, the runaway of the half-speed mirrors toward the zoom lens system is detected, and the zoom lens system is moved away from the half-speed mirrors so that it is possible to avoid the collision of the half-speed mirrors against the zoom lens system.

I claim:

1. A collision preventing mechanism for preventing a collision between a lens system and a half-speed mirror in a variable scale factor copying apparatus for forming an electrostatic latent image through said lens system onto a photo-sensitive drum by scanning an original document by a full speed mirror and said half-speed mirror, comprising:
    a half-speed mirror and a lens system;
    means for moving said half-speed mirror;
    means for moving said lens system to achieve a designated copying scale factor and for further moving said lens system away from said half-speed mirror when an abnormal approach of said half-speed mirror causes said half-speed mirror to be moved into a vicinity of a zone occupied by said lens system to prevent a collision between said half-speed mirror and said lens system; and
    detecting means for detecting said abnormal approach of said half-speed mirror.

2. The mechanism as claimed in claim 1, wherein said means for moving said lens system includes a guide rod bridged on a copying apparatus body and a frame slidably mounted on said guide rod and movable along a direction substantially parallel to an optical axis of said lens system, said lens system being fixed on said frame.

3. The mechanism as claimed in claim 2, wherein said means for moving said lens system further includes:
- a shaft;
- a swing member rotatably supported on said shaft;
- a rod-like feed screw;
- a motor;
- transmission means for engaging said motor with said feed screw to turn said feed screw a predetermined amount determined by said designated copying scale factor;
- a semiring-like nut attached to a front end of said swing member and being selectively engageable with said rod-like feed screw; and
- means for moving said semiring-like nut out of engagement with said feed screw when said half-speed mirror moves into said vicinity of said zone occupied by said lens system.

4. The mechanism as claimed in claim 3, wherein said semiring-like nut moving means comprises an L-shaped release lever having a forward end portion located in a position confronting said half-speed mirror so as to extend forward from a front surface of said zoom lens system and having a rear end portion in contact with said front end of said swing member.

5. The mechanism as claimed in claim 4, wherein said release lever is pivotally supported at a bent portion thereof on a forward end of an L-shaped arm portion of said supporting frame, said release lever having a swing hole formed therein in a vicinity of said bent portion, and further comprising a pin extending from said arm portion of said supporting frame into said hole of said release member, said pin-hole arrangement restricting an amount of pivotable movement of said release lever.

6. The mechanism as claimed in claim 5, further comprising a rod-like member fixed at a forward end of said swing member, said detecting means including a detector having a push-button portion selectively engageable with said rod-like member.

* * * * *